United States Patent Office 3,751,483
Patented Aug. 7, 1973

3,751,483
PHENOLIC THIOETHERS AND PROCESS FOR PREPARING SAME
Merle E. Cisney, Camas, Wash., assignor to Crown Zellerbach Corporation, San Francisco, Calif.
No Drawing. Filed Oct. 13, 1971, Ser. No. 188,437
Int. Cl. C07c 149/36
U.S. Cl. 260—609 F
7 Claims

ABSTRACT OF THE DISCLOSURE

Phenolic thioethers wherein the sulfur atom on the phenolic nucleus is attached to an aliphatic, alicyclic or aralkyl group of 2 to 18 carbon atoms are prepared by a reaction of metathesis whereby groups of this character, as incorporated in an organic halide, can be substituted for those of a lower character, whether saturated or unsaturated, attached to the sulfur atom on a starting phenolic thioether compound. Typically, phenolic thioethers can be prepared by refluxing methylthio-phenol with an organic halide the reaction going to completion as the low-boiling methyl chloride co-reaction product is distilled off, as it is formed, from the reaction zone. Various novel alkylthio-phenol compounds are prepared wherein the alkyl group contains an ether linkage or a hydroxy or a carboxy group. The phenolic thioethers prepared by the present invention have utility as antioxidants and as pesticides, they being variously useful as insecticides, herbicides and bactericides, and are useful as monomers in polymer formation.

BACKGROUND OF THE INVENTION

A variety of phenolic thioether compounds are known, including those employed as co-reactants in the present invention wherein the sulfur atom on the phenolic (or substituted phenolic) nucleus is attached to a lower aralkyl, aliphatic or alicyclic group such as methyl, ethyl, cyclopropyl, propyl, isopropyl, benzyl or a corresponding alkenyl or alkynyl group. Such "lower" phenolic thioether compounds can be prepared, for example, by the method disclosed in U.S. Pat. No. 3,282,979, issued Nov. 1, 1966, to Reifschneider and Kelyman. Similarly, said compounds can be prepared by heating the corresponding hydroxyaryl sulfonium chlorides taught in U.S. Pat. No. 3,133,971, issued May 19, 1964 to MacGregor.

OBJECTS OF INVENTION

It is an object of this invention to provide an efficient and inexpensive method whereby relatively higher phenolic thioethers can readily be prepared from the said lower phenolic thioethers by a simple reaction of metathesis. A further object is to provide various new and useful phenolic thioether compounds. The nature of still other objects of the invention will be apparent from a consideration of the descriptive portion to follow.

SUMMARY OF THE INVENTION

It has been discovered that lower alkyl, cyclo-alkyl, alkenyl or alkynyl groups, as represented by $R^1$ in a phenolic thioether having the formula:

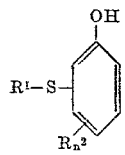

can be replaced by a radical $R^3$, as contained in organic halides having the formula $R^3$—X and having a greater number of carbon atoms than the particular $R^1$ radical present, by reacting said phenolic thioether and co-reactant compounds with one another at elevated temperatures. The ensuing metathetical reaction can be represented as follows:

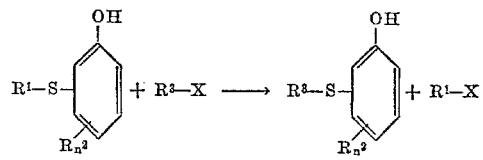

The reaction product $R^1$—X is isolated from the reaction zone as formed in order to force the reaction to completion. As a practical matter, this can readily be accomplished where the co-reactant is a higher alkyl halide by distilling off the $R^1$—X product as it is formed inasmuch as said halide product will be lower boiling than the $R^3$—X halide reactant. In a similar reaction, a bisphenolic dithioether compound is formed in this same manner by reacting the aforesaid lower phenolic thioether compound with an alpha, omega organic dihalide having the formula X—$R^4$—X wherein $R^4$, as is the case with $R^3$, has a greater number of carbon atoms than the particular $R^1$ radical which is present. This reaction can be represented as follows:

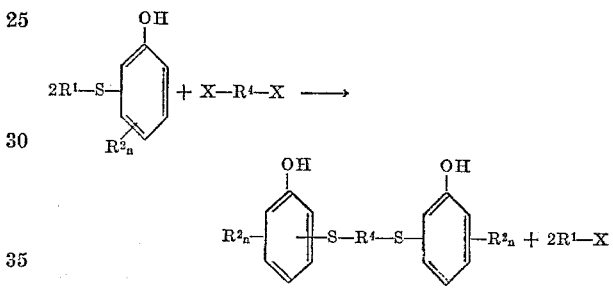

DETAILED DESCRIPTION

As employed in the formulae given above as well as elsewhere herein and in the claims, $R^1$ represents a lower alkyl, cycloalkyl, alkenyl or alkynyl radical having from 1 to about 6 carbon atoms, such as methyl, ethyl, propyl, cyclopropyl, cyclohexyl, isopropyl, ethanyl, allyl or 2-propynyl, butyl, pentyl, hexyl, etc.; $n$ is an integer of from 0 to 4, both inclusive; $R^2$, if present, represents an organic radical of from 1 to about 20 carbon atoms and probably up to about 12 carbon atoms such as alkyl, alkenyl, alkynyl, cycloalkyl, aralkyl, aryl, alkoxy, aryloxy, or hydroxy, nitro, cyano, amide or halogen, for example, which is inert under the conditions of the present reaction; $R^3$ represents an organic moiety containing a larger number of carbon atoms than the particular $R^1$ radical employed, $R^3$ being an alkyl, cycloalkyl, alkenyl, alkynyl or aralkyl group of at least 2 carbon atoms and up to about 18 carbon atoms, preferably up to about 12 carbon atoms, as represented, for example, by alkyl (including substituted alkyl) such as propyl, 2-hydroxyethyl, carboxymethyl, butyl, isobutyl, pentyl, hexyl, 2-ethylhexyl, dodecyl, hexadecyl and octadecyl, alkoxyalkyl such as cyclopentyl, cyclohexyl, methylcyclohexyl and ethylcyclohexyl, alkenyl such as methallyl, 1-, 2- or 3-butenyl, 2-hexenyl and oleyl, alkynyl uch as propargyl, and aralkyl such as benzyl, xylyl and phenylbutyl; X represents an acid radical which is preferably halo (chloro, bromo or iodo) but which can be another mineral acid residue such as sulfate, acid sulfate or sulfonate; and $R^4$ represents an alpha, omega divalent radical of at least 2 and up to about 18 carbon atoms, preferably up to about 8 carbon atoms which contains a large number of carbon atoms than the particular $R^1$ radical employed, and which can be alkylene such as ethylene, propylene, butylene, hexylene or 2-ethylhexylene, alkenylene such as propenylene or 2- butenylene, or alkylene ether such as ethyleneoxyethylene or ethyleneoxypropylene.

The relative position of the $R^1$—S— group with respect to the hydroxy group of the phenol moiety is not critical to a practice of the process hereof.

Representative phenolic thioether reactants which can be employed in a practice of this invention include:

4-(methylthio)-phenol
4-(methylthio)-2,6-xylenol
4-(methylthio)-3-methylphenol
4-(butylthio)-phenol
4-(cyclopropylthio)-phenol
4-(ethylthio)-phenol
4-(allylthio)-phenol
4-(2-propynylthio)-3,5-xylenol
3-chloro-4-(methylthio)-phenol
2,6-dichloro-4-(methylthio)-phenol
2-bromo-6-chloro-4-(methylthio)-phenol
2-(methylthio)-phenol Representative co-reactants which can be reacted with the foregoing phenolic thioethers, when the $R^1$ and the $R^3$ or $R^4$ groups bear the proper carbon number (size) relationship to one another include:

| | |
|---|---|
| allyl chloride | benzyl chloride |
| chloracetic acid | 1,4-dichlorobutane |
| butyl chloride | b,b'-dichloroethyl ether |
| hexyl chloride | b-chloroethanol |
| dodecyl chloride | propargyl chloride |

Some of the reactants listed above are more important than others for several reasons. The cost of an organic chloride is generally much lower than the corresponding bromide or iodide. In addition, while bromides and iodides react with the phenolic thioethers, the decomposition produces along with the desired products, moderate amounts of unsaturated compounds and hydrogen iodide or hydrogen bromide. Thus while these organic halides do react to a certain extent in the desired manner, the reaction tends to be uneconomical. The use of alkyl sulfates, toluene sulfonates, etc. lead to difficulties in promoting reaction to completion as well as the difficulties of securing the desired organic sulfate, toluene sulfonate etc. starting coreactant. Therefore, the organic chlorides are preferred.

In practice, best results will occur when phenolic thioethers are reacted with primary organic halides. Secondary and tertiary aliphatic halides are more subject to dehydrohalogenation than primary halides, accompanied by the formation of olefins which is an undesirable competing reaction. Acid halides do not work in the process of the present invention.

In carrying out the reaction of the present invention, the respective reactants can be added to one another in either order, and no solvent is required. The lower phenolic thioether starting materials, as well as the higher phenolic thioether products are solids which melt at temperatures usually well below 100° C., while the co-reactant halides, are normally liquid components, many of which boil above about 75° C. The various lower organic halides which are formed as co-reaction products are either gaseous at room temperatures, or boil well below the reactants and are therefore usually easily separated from the reaction zone. Accordingly, by heating the reaction mixture under reflux conditions, as is preferred, the mixture will normally be a liquid from which the organic halide product compound can readily be distilled off, as formed, while other components of the reaction mixture which vaporize can readily be condensed and returned to the mixture.

While the reaction thus goes forward to completion in the absence of a solvent other than the reactants themselves, appropriate solvents which are high boiling and inert under the reaction conditions employed can be used. Representative solvents of this type include: anisole, xylene, diethylene glycol diethyl ether.

The rate at which the reaction hereof takes place is a function of temperature, the rate increasing with higher temperatures. A minimum temperature of about 100° C. is required for the reaction to occur at a measureable rate. Generally, it is preferred to employ temperatures of about 125°–150° C. in order to obtain satisfactory reaction rates. Temperatures in excess of about 200° C. should be avoided as detrimental effects to product occurs. While reflux conditions may be commonly employed, with reactants having unusually high boiling points, it is desirable to maintain the reaction mixture at below-reflux temperatures such, as about 125° C. to 150° C.

The proportion in which the respective reactants are employed is not critical inasmuch as some reaction will occur when either reactant is employed in substantial excess. However, the most economical and efficient manner in which to conduct the reaction is to employ a small excess, usually of the order of 5 to 15%, of the halide reactant over the stoichiometric amount theoretically required. Moreover, when isolation of the co-reaction product ($R^1$—X or X—$R^1$—X) from the reaction zone becomes difficult, the use of a larger excess of the halide reactant, usually 100% or more, will have the effect of forcing the reaction in the desired direction.

In conducting the reaction, nitrogen or other inert gas may be bubbled through the reaction mixture or be otherwise employed as a sweep to move the formed co-reaction product out of the reaction zone as the reaction is taking place, whereby causing the reaction to go to completion.

The reaction can be carried out under atmospheric, sub-atmospheric or super-atmospheric pressures. Thus, with reaction mixtures having a relatively low reflux temperature, resort may be had to elevated pressures in order to facilitate use of higher reflux temperatures. As a general rule, however, atmospheric pressures can be employed in essentially all cases. However, in the latter stages of the reaction, sub-atmospheric pressures may be employed in order to remove the lower boiling $R^1$—X reaction product from the reaction zone and thus speed the reaction to completion.

Reaction times required to bring the reaction to completion are found to vary over a wide range, some preparations being complete in periods of 2 to 3 hours while others require extended reflux times such as 24, 36 or more hours. The completion of the reaction can be determined by sampling the effluent gases from the reaction zone and determining their content of the $R^1$—X product. Absence thereof indicates that the reaction is complete.

The desired phenolic thioether product can be recovered, frequently in yields approaching 100%, by conventional methods known to the skilled in the art. For example, when using an excess of the halide reactant, the product will normally be made up essentially of the desired phenolic thioether, together with unreacted halide which can be distilled from reaction mixture under ambient or reduced pressures. The residual phenolic thioether product compound can then be separated from any remaining phenolic thioether reactant and recovered in pure form by recrystallization from an appropriate solvent such as a 50–50 mixture of benzene and petroleum ether. Certain of the thioether product compounds can also be recovered in pure form by distillation in vacuo.

Phenolic thioethers such as those proposed by a practice of this invention have known utility as antioxidants, as pesticides, and as monomers in polymer formation.

A practice of the present method has provided a variety of novel phenolic thioether compounds, including 4-(carboxymethylthio)-phenol, 2,2'-bis (p-hydroxyphenylthio)-diethyl ether and 4-(2-hydroxyethylthio)-phenol. These compounds share the useful characteristics recited above, while at the same time offering added advantages. Thus, the 2,2'-bis (p-hydroxyphenylthio)-diethyl ether compound has unusually good solubility characteristics while the carboxyl or hydroxy substituent groups present in the other two new compounds facilitiate their usageas monomers in various polymer forming operations. For example, the 4-(2-hydroxyethylthio)-phenol compound, which incorporates two hydroxy groups, can be reacted with appropriate compounds to form useful polyester products. The 4-(carboxymethylthio)-phenol can be reacted with pentaerythritol to form a product compound having a molecular weight of 800, containing four phenolic hydroxy groups and 4 sulfide groups.

The 2,2'-bis(p-hydroxyphenylthio)-diethyl ether compound has good solubility in various polyester monomers wherein it lends antioxidant characteristics to the final polymer.

Same for 4-(2-hydroxyethylthio)-phenol as above. The 4-(carboxymethylthio)-phenol can be reacted with pentaerythritol to form pentaerythritol tetrakis-4-hydroxyphenylthioglycollate. This product

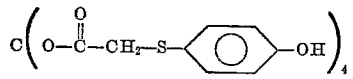

having four reactive groups can be used in crosslinking various polyester compositions while introducing the stabilizing effect of the mercaptophenol moiety or color, aging and other deteriorative processes. 4-(2-hydroxyethylthio)-phenol can be reacted with polyester monomers such as dimethyl terephthalate to give polyesters or polyester mixtures containing the moiety

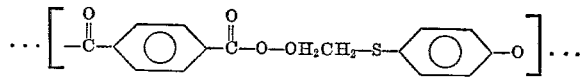

or with phosgene to give polycarbonates or polycarbonate mixtures having the following grouping present

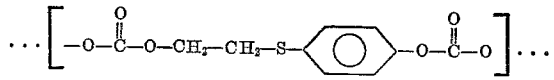

These polymers incorporating 4-(2-hydroxyethylthio)-phenol would provide resistance to discoloration, aging and other deterioration.

DESCRIPTION OF SOME PREFERRED EMBODIMENTS

The following examples illustrates the present invention but are not to be construed as limiting the same.

Example 1.—4-(n-dodecylthio)-phenol

In this operation there was employed a 500 ml., round bottom, 3-necked flask equipped with a gas inlet, a thermometer and a reflux condenser having a gas outlet leading from its top to two Dry Ice-cooled traps in series. In the flask there was placed 140 g. (1.0 mole) of 4-(methylthio)-phenol along with 224 g. (1.1 moles) of n-dodecyl chloride. The flask and its contents were then heated in an oil bath at 155° C. for 36 hours, it being noted that the reaction mixture became homogenous after the first hour of heating. Due to the extremely volatile nature of the methyl chloride co-reaction product, only 11 ml. of this compound was collected in the cold trap after the 36 hours. The theoretical amount of methyl chloride was 50 grams, and after the weight of reaction mixture has been reduced in this amount, the reaction was judged to be complete and heating was stopped. The contents of the flask (315 g.) were then taken up in a solvent made up of benzene and petroleum ether in equal parts, and recrystallized therefrom. There was thus recovered, in nearly theoretical yield, a mass of shiny, white, plate-like crystals having a melting point of 86–87° C. and identified as the above-captioned compound.

Example 2.—3,5-dimethyl-4-hydroxyphenylthioglycolic acid

In a 500 mol., 3-necked, round bottom flask equipped with a stirrer, gas inlet tube, condenser with a gas outlet tube at the top was placed 168 g. (1.0 mole) 4-(methylthio)-2,6-xylenol and 103.4 g. (1.1 moles) chloroacetic acid with a nitrogen sweep thru the system and the effluent gases led thru a Dry Ice-cooled trap, the reaction mixture was heated at 140° C. for 3 hours. During this time about 85% of the theoretical amount of methylchloride is collected in the trap. The crude reaction product was poured into 200 cc. hot water from which the product crystallized in near colorless needles, melting at 103–105° C. The product weighed 200 grams, representing a yield of 94% of the theoretical amount. The neutralization equivalent of the product was found to be 210.1 and agreed well with the theoretical value of 212.

Example 3.—4-(N-butylthio)-phenol

In a 5 liter, 3 necked, round bottom flask equipped with a gas inlet tube and gas outlet tube, stirrer, dropping funnel and condenser, was placed 2100 g. (15 moles) 4-(methylthio)-phenol. Over a 14 hour period with the temperature maintained at 130–170° C., 1664 g. (18 moles) of n-chlorobutane was added while a slow stream of nitrogen was passed thru the system. During this time, a total of 99% of the theoretical amount of methyl chloride was collected in a Dry Ice-cooled trap in the exit gas stream. The reaction product was fractionally distilled to give 2630 g. of a product cut boiling at 130–135° C. at 0.05 mm. Hg pressure. The product solidified to a white crystalline solid melting at 47–49° C. The reported melting point of this material in the literature is 49–50° C. The yield of 4-(butylthio)-phenol is 96.5%.

Example 4.—4-hydroxyphenylthioglycollic acid

In a 2 liter, round-bottom, 3-necked flask equipped with gas inlet tube, condensed with a gas outlet tube at the top, a stirrer and a thermometer was placed 560 g. (4 moles) 4-(methylthio)-phenol and 416 g. (4.4 moles) chloroacetic acid. The reaction mixture was heated at 115–120° C. for 12 hours with a nitrogen sweep employed to remove formed methyl chloride as collected. At the end of the heating time, the reaction mixture is poured into 800 cc. hot water and allowed to crystallize. There is obtained 667 g. (91% of the theoretical amount) of the desired material melting at 145–147° C. The neutralization equivalent of this compound was found to be 180 and agrees well with the theoretical value of 184.

Other examples

From 4-methylthio)-phenol and 1-bromobutane is obtained 4-(butylthio)-phenol.

From 2-chloro-4-(methylthio)-phenol and 1-chlorododecane is obtained 2-chloro-4-(n-dodecylthio)-phenol.

From 4-(methylthio)-phenol and 1-iodooctane is obtained 4-(n-octylthio)-phenol.

From 4-(methylthio)-phenol and 6-chloro-1-hexyne is obtained 4-(hex-5-ynylthio)-phenol.

From 4-(ethylthio)-phenol and 8-bromooctanoic acid is obtained 4-(7-carboxyheptyl)-phenol.

From 4-(methylthio)-phenol and 2-chloro ethanol is obtained 4-(2-hydroxyethylthio)-phenol.

From 4-(methylthio)-phenol and octadecyl chloride is obtained 4-(octadecylthio)-phenol.

I claim:

1. A process for preparing phenolic thioether compounds comprising admixing (1) a phenolic thioether reactant compound wherein the sulfur atom on the phenolic nucleus is attached to a radical selected from the group consisting of alkyl, cycloalkyl, alkenyl or alkynyl radicals having from 1 to about 6 carbon atoms with (2) an organic halide reactant compound wherein the organic moiety attached to the halide radical is selected from the group consisting of alkyl, cycloalkyl, alkenyl, alkynl or aralkyl groups having from 2 to 18 carbon atoms and a greater number of carbon atoms than the aforesaid sulfur-attached radical of the thioether reactant compound, heating the resultant admixture to a temperature in the range of about 100° C. to about 200° C. to induce a reaction of metathesis, removing the halide reaction product compound, as formed, from the reaction mixture, and recovering the phenolic thioether product.

2. The process of claim 1 wherein the halide product compound is distilled off, as formed, from the reaction mixture.

3. The process of claim 1 wherein the organic halide reactant compound is a primary alkyl chloride.

4. The process of claim 1 wherein the organic halide reactant compound is an alpha, omega-alkylene dihalide or an alpha, omega-alkyleneether dihalide.

5. The process of claim 1 wherein the phenolic thioether reactant compound is methylthio-phenol.

6. The process of claim 1 wherein the temperature is between about 125° C. to about 150° C.

7. A process of preparing phenolic thioether product compounds comprising admixing methylthio-phenol and a primary organic halide wherein the organic moiety attached to the halide radical is selected from the group consisting of alkyl, cycloalkyl, alkenyl, or aralkyl groups having from 2 to about 12 carbon atoms, heating the admixture in a reaction zone to a temperature in the range of about 100° C. to about 200° C. to induce a reaction of metathesis, removing methyl halide from the reaction zone as it is formed, and recovering the phenolic thioether compound.

References Cited
UNITED STATES PATENTS
3,350,459  10/1967  Pelster et al. _____ 260—609 F LEWIS GOTTS, Primary Examiner
D. R. PHILLIPS, Assistant Examiner U.S. Cl. X.R.
260—47 C, 47 X, 470, 596